United States Patent [19]

Hirschkorn

[11] Patent Number: 4,840,554
[45] Date of Patent: Jun. 20, 1989

[54] EXTRUSION HEAD EQUIPPED WITH A CLAMPING DEVICE FOR THE TOOL COMPONENTS

[75] Inventor: Ingo Hirschkorn, Neu Wulmstorf, Fed. Rep. of Germany

[73] Assignee: Fried. Krupp Gesellschaft mit beschränkter Haftung, Essen, Fed. Rep. of Germany

[21] Appl. No.: 179,941

[22] Filed: Apr. 11, 1988

[30] Foreign Application Priority Data

Apr. 11, 1987 [DE] Fed. Rep. of Germany .... 3712343.2

[51] Int. Cl.$^4$ .............................................. B29C 47/00
[52] U.S. Cl. ..................................... 425/190; 425/188; 425/191; 425/192 R; 425/461; 425/592
[58] Field of Search ..... 425/192, DIG. 221, DIG. 48, 425/593, 592, 594, 188, 190, 191, 186, 461

[56] References Cited

U.S. PATENT DOCUMENTS

| | | | |
|---|---|---|---|
| 2,897,543 | 8/1959 | Weston et al. | 18/13 |
| 3,535,738 | 10/1970 | Vossen | 18/12 |
| 4,137,027 | 1/1979 | Rüger | 425/133.5 |
| 4,354,814 | 10/1982 | Grimminger et al. | 425/186 |
| 4,358,261 | 11/1982 | Ohki | 425/131.1 |
| 4,619,599 | 10/1986 | Herbert et al. | 425/186 |
| 4,642,039 | 2/1987 | Anders | 425/140 |
| 4,652,224 | 3/1987 | Golisch | 425/131.1 |
| 4,652,410 | 3/1987 | Inoue et al. | 264/39 |

FOREIGN PATENT DOCUMENTS

| | | | |
|---|---|---|---|
| 548727 | 11/1957 | Canada | 425/192 |
| 765383 | 1/1957 | United Kingdom | 425/192 |
| 1521756 | 8/1978 | United Kingdom | . |

Primary Examiner—Jay H. Woo
Assistant Examiner—Khanh P. Nguyen
Attorney, Agent, or Firm—Spencer & Frank

[57] ABSTRACT

An extrusion tool includes an end plate, a plate holder cassette seating the end plate and having opposite first and second faces; an extrusion head seating the cassette, and a first clamping device having an operative position for pressing the cassette and the end plate as a unit against the extrusion head by engaging an outer face of the end plate. The first clamping device further has a withdrawn position in which it permits a removal of the end plate from the cassette and a removal of the cassette from the extrusion head. There is a further provided a second clamping device for pressing, in a clamping position thereof, the cassette against the extrusion head by engaging a front face of the cassette externally of the end plate, whereby the end plate is, in the withdrawn position of the first clamping device, removable from the cassette while the cassette remains pressed against the extrusion head by the second clamping device.

11 Claims, 3 Drawing Sheets

EXTRUSION HEAD EQUIPPED WITH A CLAMPING DEVICE FOR THE TOOL COMPONENTS

BACKGROUND OF THE INVENTION

1. Field of the Invention

The present invention relates to an extrusion head having upper and lower clamping elements which are movable against and act on a die plate (also called a final die, finishing die or end plate and hereafter also referred to as "end plate") for clamping the die plate and a plate holder (also called preforming die, plate holder or cassette and hereafter referred to as "cassette") to the extrusion head.

2. Discussion of the Prior Art

Extrusion tools which process rubber mixtures are provided with extrusion heads that contain clamping devices which comprise the clamping elements proper and drive units for moving the clamping elements. The drive units utilized in the clamping devices are primarily hydraulic cylinders. The clamping elements may be configured as clamping wedges as disclosed, for example, in GDR (German Democratic Republic) Pat. No. 124,369 to which corresponds U.S. Pat. No. 4,137,027 or as pivotal levers as disclosed, for example, in German Offenlegungsschrift No. 2,457,532 to which corresponds United Kingdom Pat. No. 1,521,756.

At the end of the extension head is a cassette which has a recess that contains a final die or end plate. When the extrusion head is ready for operation, the clamping elements are engaged and forced onto the end plate with a force sufficient to sealingly press the end plate and the cassette against the extrusion head.

When a strip of a different profile is to be extruded, it is frequently necessary only to replace the particularly configured end plate, while the cassette may remain in place at the extrusion head. In practice, however, generally if the end plate is exchanged, the cassette must also be removed. This is so because the rubber material to be processed is able to flow between the head components of the extrusion head (i.e. the opposing faces of the cassette and the extrusion head) due to the fact that the external contact pressure on the cassette has been reduced following the retraction of the clamping wedges. When the extrusion head resumes operation, the rubber film between the head components causes the position of the components to deviate from the predetermined position and may also cause the clamping wedges to become wedged in their guides. It is a further disadvantage of having to replace the cassette together with the end plate that excessively long down times result for the entire extrusion system.

It is also known to eject the cassette from the extrusion head by the use of separate, laterally disposed cylinders.

SUMMARY OF THE INVENTION

It is an object of the present invention to provide an extrusion head having a cassette, an end plate and a simple structural arrangement which permits a replacement of the end plate independently from the cassette.

The above and other objects are accomplished by the invention in which an extrusion head has upper and lower clamping elements which are movable against and act on an end plate for clamping the end plate and a cassette to the extrusion head. The extrusion head is provided with an additional clamping device which has movable clamping elements which may be pressed against the front surface of the cassette, whereby the movable clamping elements contact the front surface of the cassette.

Since the additional clamping elements only contact the front surface of the cassette and thus do not engage the end plate, the end plate can be removed and exchanged in a simple and unimpeded manner, while the cassette remains clamped against the extrusion head.

Following the installation of a new end plate, the plate clamping elements are once again pressed against the end plates so that the end plate and cassette are held against the extrusion head, and the clamping force on the additional clamping elements can be removed.

If it is desirable to remove and exchange the cassette, the additional clamping elements can be rotated from the area of the cassette and the cassette can be freely removed.

By using levers as the additional clamping elements, favorable force directions can be realized in the present invention.

Further, by shaping the levers as double-arm levers, the power device which exerts forces on the additional clamping elements may be used not only to press the cassette into the extrusion head, but to push the cassette away therefrom. By virtue of this arrangement the separate cylinders used for pushing the cassette away from the extrusion head may be omitted.

By using rollers disposed at the end of the levers, a friction-free contact pressure may be applied to the cassette. According to another feature of the invention, the pivot axis for the levers is situated behind the front surface of the cassette, as a result of which the levers are able to move rapidly away from the region of the cassette.

DESCRIPTION OF THE PREFERRED EMBODIMENTS

Figure 1:
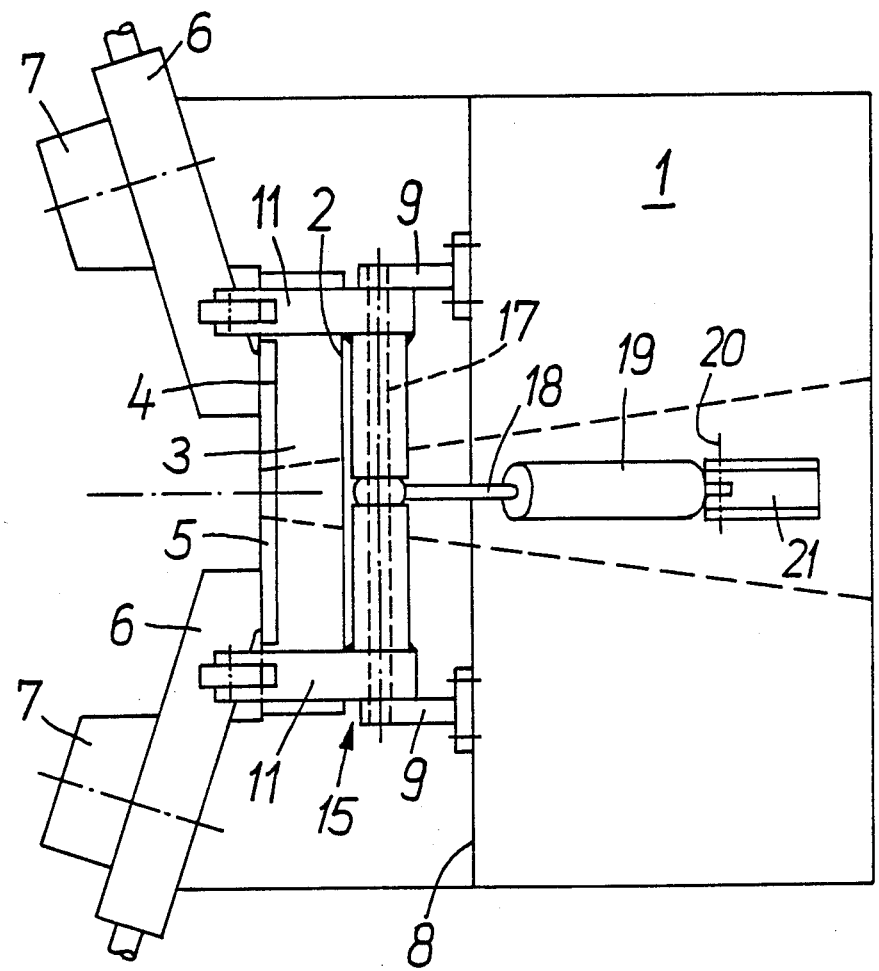
FIG. 1 is a side elevational view of an extrusion head according to a preferred embodiment of the invention.
Figure 2:
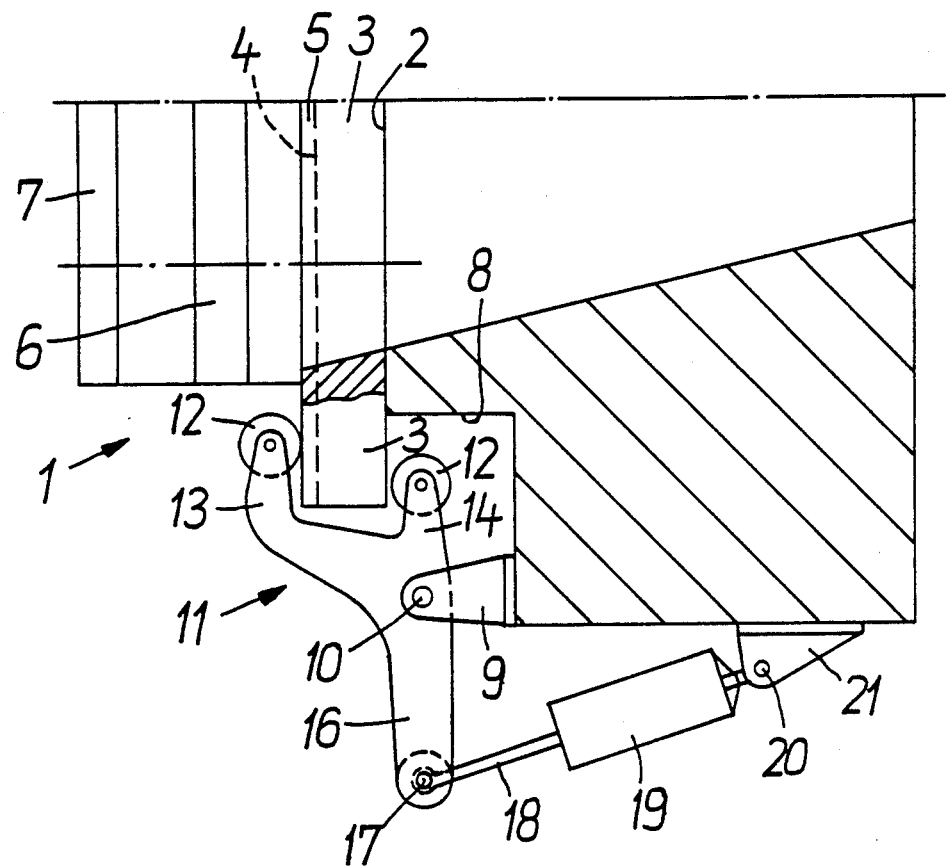
FIG. 2 is a partially sectional top plan view of a symmetrical half of the structure of FIG. 1.

Turning to FIGS. 1 and 2, there is shown an extrusion head 1 in an operational condition having a recess 2 formed therein for placement of a cassette 3. Cassette 3 includes a recess 4 designed to accommodate an end plate 5. Clamping wedges 6 are provided at an angle from the top and bottom and extend towards the front face of the end plate 5 from opposite sides thereof. Clamping wedges 6 are guided between extrusion head 1 and a respective clamping wedge holder 7 and are moved relative to the end plate 5 by a hydraulic cylinder (not shown). If pressure is applied to clamping wedges 6 from the hydraulic cylinder, the clamping wedges 6 are pressed against the end plate 5, so that the latter, together with the cassette 3 is sealingly forced into the head components of the extrusion head 1.

FIG. 2 shows that in the region of the lateral edges of cassette 3, extrusion head 1 includes a recess 8 which is equipped with bearing supports 9. The respective bearing supports 9 on each side of extrusion head 1 have a Y-shaped double-arm lever 11 mounted therein. Each lever 11 is pivotal in bearing support 9 about an upstanding axis 10. Two levers 11 are used on each side of the extrusion head 1. Each lever 11 has two branches 13 and 14 which are equipped with a roller 12 and which form a fork-like construction that straddles a lateral end of cassette 3, with the front branch 13 being pivotal against the front face and the rear branch 14 being pivotal against the rear face of cassette 3.

The two levers 11 are combined into a claw-like lever unit 15. Each lever 11 has an arm 16 which faces away from the cassette 3. The arms 16 are connected by a common rod 17 which is articulated to a piston rod 18 of a double-acting hydraulic cylinder 19. Hydraulic cylinder 19 is in turn jointed to a hinge point 20 of a bracket 21 that is affixed to the extrusion head 1.

Pivot axis 10 of the lever unit 15 is disposed behind the front surface of cassette 3 so as to effect fast pivoting of front arm 13 from the region of the cassette 3.

Figure 3:
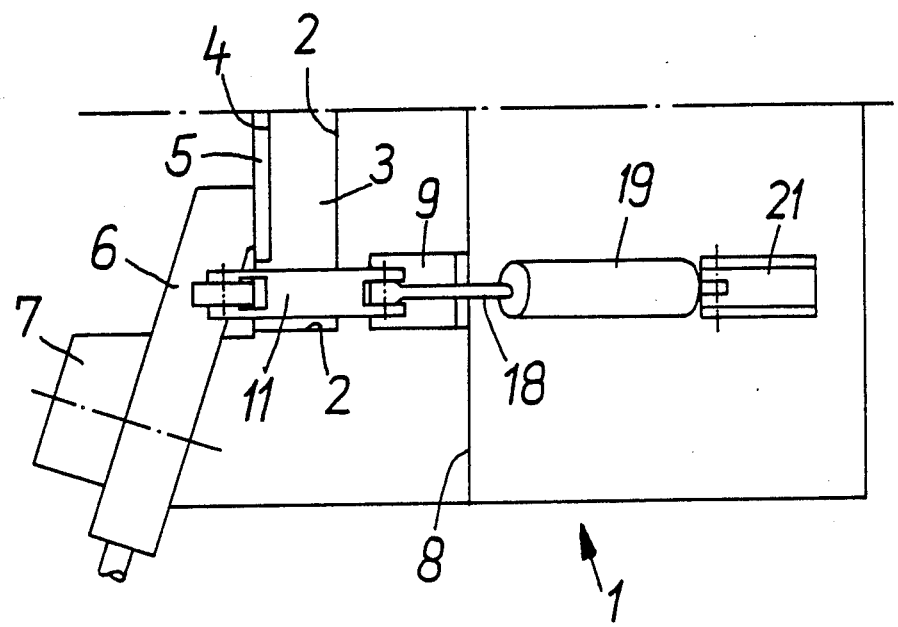
FIG. 3 is a side elevational view of a symmetrical half of an extrusion head according to another preferred embodiment of the invention.

FIG. 3 discloses another embodiment where each lever 11 is associated with a separate cylinder 19.

To remove and replace only the end plate 5, the following steps are performed: first, hydraulic cylinders 19 are charged such that the front branches 13 are pressed against the front surface of cassette 3 by way of rollers 12. This causes cassette 3 to be firmly held in extrusion head 1. Next, clamping wedges 6 are retracted, whereupon the end plate 5 may be removed. After the new end plate 5 has been placed in recess 4, the clamping wedges 6 are moved against the new end plate 5 and thereafter the hydraulic cylinder 19 is depressurized.

To remove and replace both the end plate 5 and the cassette 3 from the extrusion head 1, the following operations are performed: first, clamping wedges 6 are released and retracted. Next, hydraulic cylinder 19 is charged so that rear branches 14 press against the rear surface of the cassette 3 and move it out of extrusion head 1. A new cassette 3 is then placed on positioning arms (not shown) and front branches 13 are used to install and push the new cassette 3 into extrusion head 1.

Figure 4:
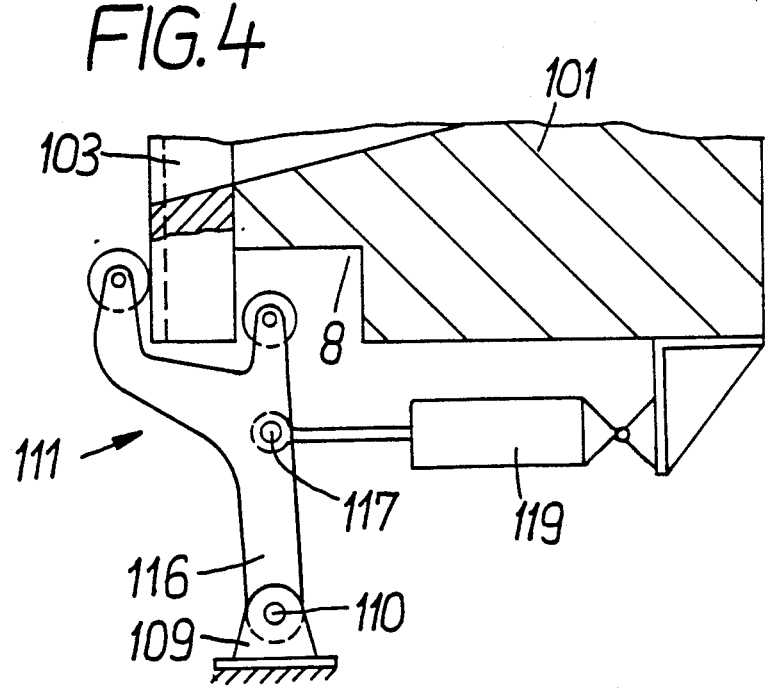
FIG. 4 is a partially sectional fragmentary top plan view of an extrusion head according to a further preferred embodiment of the invention.

FIG. 4 discloses another preferred embodiment wherein a cassette 103 is held in extrusion head 101 by Y-shaped, double arm levers 111, whose arm 116 is pivotal about a fixed axis 110 in a bracket 109 fixedly mounted externally of the extrusion head 101. Levers 111 are articulated by a common connecting rod 117 to a hydraulic cylinder 119 which, in turn, is pivotally mounted on the extrusion head 101.

The present disclosure relates to the subject matter disclosed in Federal Republic of Germany Application Serial No. P 37 12 343.2, filed Apr. 11th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an extrusion tool including
   an end plate,
   a plate holder cassette including means for seating said end plate, and having opposite first and second faces;
   an extrusion head including means for seating said cassette; said first face of said cassette being oriented towards said extrusion head and said second face of said cassette being oriented away from said extrusion head;
   first clamping means having an operative position for pressing said cassette and said end plate as a unit against said extrusion head by engaging an outer face of said end plate; said first clamping means having a withdrawn position in which said first clamping means permits a removal of said end plate from said cassette and a removal of said cassette from said extrusion head;
   the improvement comprising a second clamping means for pressing, in a clamping position thereof, said cassette against said extrusion head by engaging said second face of said cassette externally of said end plate, whereby said end plate is, in said withdrawn position of said first clamping means, removable from said cassette while said cassette remains pressed against said extrusion head by said second clamping means.

2. An extrusion tool as defined in claim 1, wherein said second clamping means comprises
   (a) a plurality of spaced clamping levers each having a clamping end engaging said second face of said cassette in the clamping position and being disengaged therefrom in a releasing position of said second clamping means;
   (b) pivot means for pivotally supporting each said clamping lever for rotation about a pivot axis; and
   (c) power means connected to said levers for pivoting said levers into the clamping position or the releasing position.

3. An extrusion tool as defined in claim 2, wherein the pivot axis of each clamping lever is spaced from said first face of said cassette, in a direction towards said extrusion head.

4. An extrusion tool as defined in claim 2, wherein said clamping end of each clamping lever comprises a roller.

5. An extrusion tool as defined in claim 2, wherein said power means comprises a hydraulic cylinder.

6. An extrusion tool as defined in claim 2, wherein said power means comprises a single common power device connected to said clamping levers.

7. An extrusion tool as defined in claim 2, wherein each clamping lever comprises a first arm extending from the pivot axis towards said cassette and a second arm extending from the pivot axis away from said cassette; said second arm being coupled to said power means.

8. An extrusion tool as defined in claim 2, wherein said power means comprises separate power devices each connected to a respective said clamping lever.

9. An extrusion tool as defined in claim 2, wherein each said clamping lever has first and second branches; said first branch having a first end constituting said clamping end, and said second branch having a second end arranged to move against and engage said first face of said cassette upon motion of said clamping levers into the releasing position for pushing said cassette away from said extrusion head.

10. An extrusion tool as defined in claim 9, wherein said second end of each clamping lever comprises a roller.

11. An extrusion tool as defined in claim 9, wherein said first and second branches of each clamping lever together constitute a first arm thereof extending from said pivot axis toward said cassette; each clamping lever further comprising a second arm extending away from said cassette; said second arm being coupled to said power means.

* * * * *